US008870213B1

(12) United States Patent
Xu

(10) Patent No.: US 8,870,213 B1
(45) Date of Patent: Oct. 28, 2014

(54) SINGLE-HAND FOLDABLE BABY STROLLER

(71) Applicant: Dongguang Master Kids Toy Co., Ltd., Taipei (TW)

(72) Inventor: Jiahong Xu, Dongguang (CN)

( * ) Notice: Subject to any disclaimer, the term of this patent is extended or adjusted under 35 U.S.C. 154(b) by 0 days.

(21) Appl. No.: 13/897,460

(22) Filed: May 20, 2013

(51) Int. Cl.
*B62B 7/10* (2006.01)
*B62B 7/06* (2006.01)

(52) U.S. Cl.
CPC .................................... *B62B 7/06* (2013.01)
USPC ........................................ 280/642; 280/647

(58) Field of Classification Search
USPC ....................................... 280/642, 647, 641
See application file for complete search history.

(56) References Cited

U.S. PATENT DOCUMENTS

| | | | | |
|---|---|---|---|---|
| 6,869,096 | B2 * | 3/2005 | Allen et al. | 280/642 |
| 6,991,248 | B2 * | 1/2006 | Valdez et al. | 280/647 |
| 7,632,035 | B2 * | 12/2009 | Cheng | 403/98 |
| 8,205,907 | B2 * | 6/2012 | Chicca | 280/642 |
| 8,226,110 | B2 * | 7/2012 | Liao | 280/642 |
| 8,308,391 | B2 * | 11/2012 | Cheng | 403/98 |
| 8,322,744 | B2 * | 12/2012 | Ahnert et al. | 280/642 |
| 8,408,580 | B2 * | 4/2013 | Liao | 280/642 |
| 8,448,977 | B2 * | 5/2013 | Grintz et al. | 280/642 |
| 8,485,547 | B2 * | 7/2013 | Hsu | 280/647 |
| 8,714,581 | B2 * | 5/2014 | Fritz et al. | 280/642 |
| 2010/0259021 | A1 * | 10/2010 | Ahnert et al. | 280/47.4 |
| 2012/0261906 | A1 * | 10/2012 | Chicca | 280/642 |

* cited by examiner

*Primary Examiner* — Jeffrey J Restifo

(57) ABSTRACT

The present invention reveals a Single-Handedly Foldable Stroller that includes a Hand Tube, a Front Leg Tube, a Front Helm, a Rear Leg Tube, a Rear Helm, and 2 Joint Components. Said Joint Components connect the Hand Tube, the Front Leg Tube and the Rear Leg Tube with each other. Each said Joint Components includes an Upper Joint, a Lower Joint, a Sleeve, a Sleeve Limiting Pedestal and a Folding Operation Component. The Upper Joint is connected with the Hand Tube, and the Lower Joint is connected with the Front Leg Tube. One end of the Sleeve is inserted in the Sleeve Limiting Pedestal, while the other end is sleeved in the Rear Leg Tube. Moving the Sleeve through the Folding Operation Component would gradually turn the Upper Joint and the Lower Joint counter-clockwise, accomplishing the folding/expanding of the Stroller.

8 Claims, 6 Drawing Sheets

SINGLE-HAND FOLDABLE BABY STROLLER

FIELD OF THE INVENTION

The present invention relates to a Baby Stroller, particularly to a Baby Stroller that can be folded single-handedly.

BACKGROUND OF THE INVENTION

A traditional Baby Stroller includes a Handle, Joints, a Seat Frame, Rear Legs, a Seat, and a Shade Awning. The Frame that is used to support and withdraw the Seat and the Shade Awning is so called a Chassis, which includes a Folding Mechanism that allows the Chassis to expand when using and fold when being stored. A traditional Baby Stroller's Folding Mechanism is a Joint that connects the Handle with the Hand Tube's upper part through rivets. Pressing a button from the Folding Control Device can pull the Latch through towing and detach it from the Joint, meanwhile turning the Hand Tube to complete the folding of the Stroller. Releasing the button from the Folding Control Device can restore the position of the Latch by the working of the Restoring Spring. A traditional Baby Stroller's advantage is that the folding can be performed either vertically or horizontally, due to the Folding Handle being small. However, its disadvantage is that the folding requires several movements to perform the folding movement of the Stroller by bending over, kicking, or Squat. As summed up, the folding procedures are complicated which needs further improvements.

SUMMARY OF THE INVENTION

The purpose of the present invention is to resolve the inadequacy of conventional design, which provides a Single-Hand Foldable Baby Stroller that comprises:

A Hand Tube, a Front Leg Tube, a Front Helm, a Rear Leg Tube, a Rear Helm, and 2 Joint Components, wherein said Joint Components connect the Hand Tube, Front Leg Tube and Rear Leg Tube together. Each said Joint Components includes an Upper Joint, a Lower Joint, a Sleeve tube, a Position Limiting Pedestal and a Folding Operation Component. Said Upper Joint is connected with the Hand Tube, and said Lower Joint is connected with the Front Leg Tube. One end of said Sleeve tube is inserted into the Position Limiting Pedestal, and another end is sleeved by the Rear Leg Tube.

Said Upper Joint, Lower Joint and Position Limiting Pedestal, can be assembled and turn to fold. An Alignment Pin is inserted through the grooves on said Upper Joint, Lower Joint, Sleeve Tube and Position Limiting Pedestal, and 2 Path Troughs are separately on the top of said Upper Joint and the bottom of said Lower Joint, align opposingly to each other. There is a common intersection point between every Path Grooves, and a Latch that is inserted through the Path Grooves and also inserted on the Sleeve Tube.

Said Folding Operation Component include a Restoring Spring inserted in the Sleeve Tube, a Pulling Component, a Fastening Component that positions the Sleeve in the Rear Leg Tube, and a Button Component that drives the Fastening Component.

Said Button Component drives the Fastening Component to detach from the Rear Leg Tube, and the Fastening Component drives the Sleeve Tube to move, leading the Latch to move through the Path Grooves and cause the Upper Joint and Lower Joint to turn counter-clockwise, accomplishing the Folding/Expanding of the Stroller.

Said Path Grooves positioned on said Upper Joint and Lower Joint include two Gradient Arc-shaped Grooves with a Fastening Hole on one end of each Gradient Arc-shaped Groove, which can cause the Latch to fall in when the Stroller expands.

Said Sleeve Tube has a Bar-shaped Groove that allows the Alignment Pin to penetrate through and limit Sleeve Tube's movement, along with a Slot for the Restoring Spring. There is a Rivet that penetrates through the Sleeve Tube, Rear Leg Tube and said Slot to fix them together. There is a Trench on the spot of the Sleeve Limiting Pedestal that corresponds to the Alignment Pin and is parallel to the Bar-shaped Groove. The Latch is moved through the Slot by the Sleeve.

Said Button Component includes a Button and a Button Spring inside the Button. The Button is through the Rear Leg Tube and hold the leg in the Sleeve Tube. The Fastening Component includes a Spring inserted in the Sleeve Tube and a Fastening Stud, one end of said Fastening Stud is disposed on the wall of the Rear Leg Tube. Said Button and Fastening Stud correspond to each other, with the Button pushing, the Fastening Stud detaches from the wall of the Rear Leg Tube by pressing the Button Spring.

Said Button is installed on the Rear Leg Tube through the Fixing Pedestal, with the tail extend of the Button penetrating through the Fixing Pedestal into the Rear Leg Tube. There is a hole on said Fixing Pedestal for said Button Spring to penetrating through, along with a Lid installed on the outside surface of said Fixing Pedestal.

Said Pulling Component includes a Carrying Handle, a Lever, a Pulling String, and a Pulling Block. The Lever is pivotally connected to the Fixing Pedestal, with the Carrying Handle installed on the Lever and crosses through the Stroller Seat horizontally, said Carrying Handle flip the Lever over upwards. Said Lever and the Pulling Block are connected through the Pulling String and said Carrying Handle, Lever, and Pulling Block interact each other, with the Pulling Block moving the Sleeve Tube in the Installment Hole that is drilled on the Sleeve Tube.

Said Joint Component has a Protective Shell installed on its outside. Said Protective Shell includes an Outer Shell and an Inner Shell. There is an Armrest installed on the Protective Shell and crosses through the Stroller Seat horizontally.

The two ends of the Armrest are installed on the Inner Shell, with an Armrest Switch installed on the Armrest. Said Armrest Switch includes an Armrest Button and an Armrest Button Spring, with the Armrest Button embedded on the Inner Shell and exposed outside the Armrest. The Armrest Button Spring is installed on the Armrest Button and is connected with the Lower Joint.

Furthermore, the Upper Joint and the Hand Tube, along with the Lower Joint and the Front Leg Tube, are fixed together by the Rivet.

By the description above, the present invention has the following advantages compare to the present techniques: the present invention's greatest advantage is that it simplifies the traditional Stroller's series of complicated folding procedures, in which with the press of a button from the Folding Operation Component and the Carrying Handle lifted single-handedly, the Stroller's Front Leg Tube and Hand Tube would be folded downward by its own weight, making the folding simple, faster and convenient. Also, the expanding doesn't need complicated procedures as well, as with the lift of the Hand Tube, the Gradient Arc-shaped Groove on the Upper Joint would move the Latch on one end of the Sleeve upward, while the Latch on the other end of the Sleeve Tube would move the Front Leg Tube and the Hand Tube on the opposite direction in the Lower Joint's Path Groove, with the Restoring Spring restoring the Sleeve Tube to its own position and jamming the Upper Joint and Lower Joint, completing the expanding of the Stroller, which is simple and convenient.

DETAILED DESCRIPTION OF PREFERRED EMBODIMENT

Figure 1:
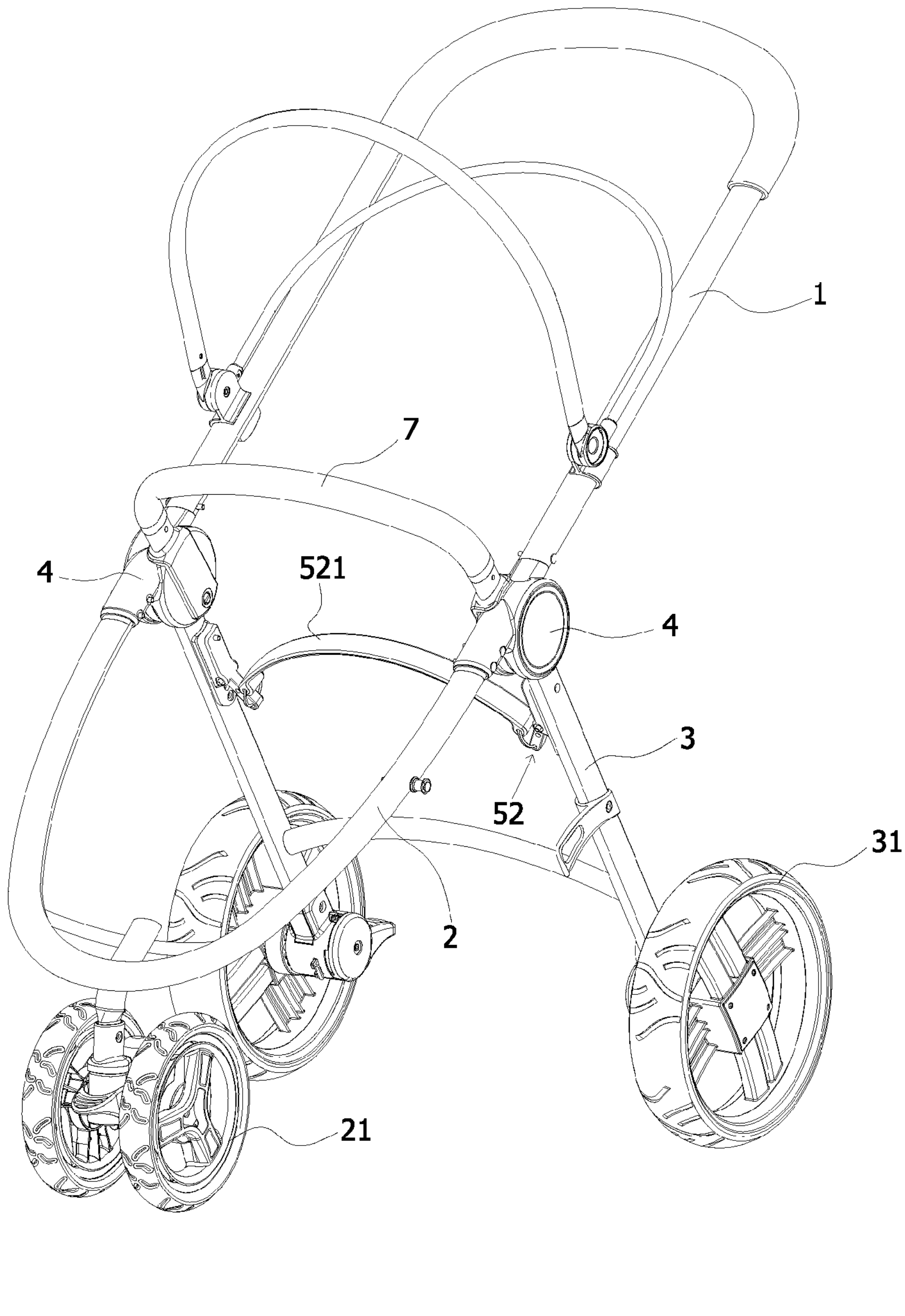
FIG. 1: A 3-Dimensional appearance of the present invention.
Figure 2:
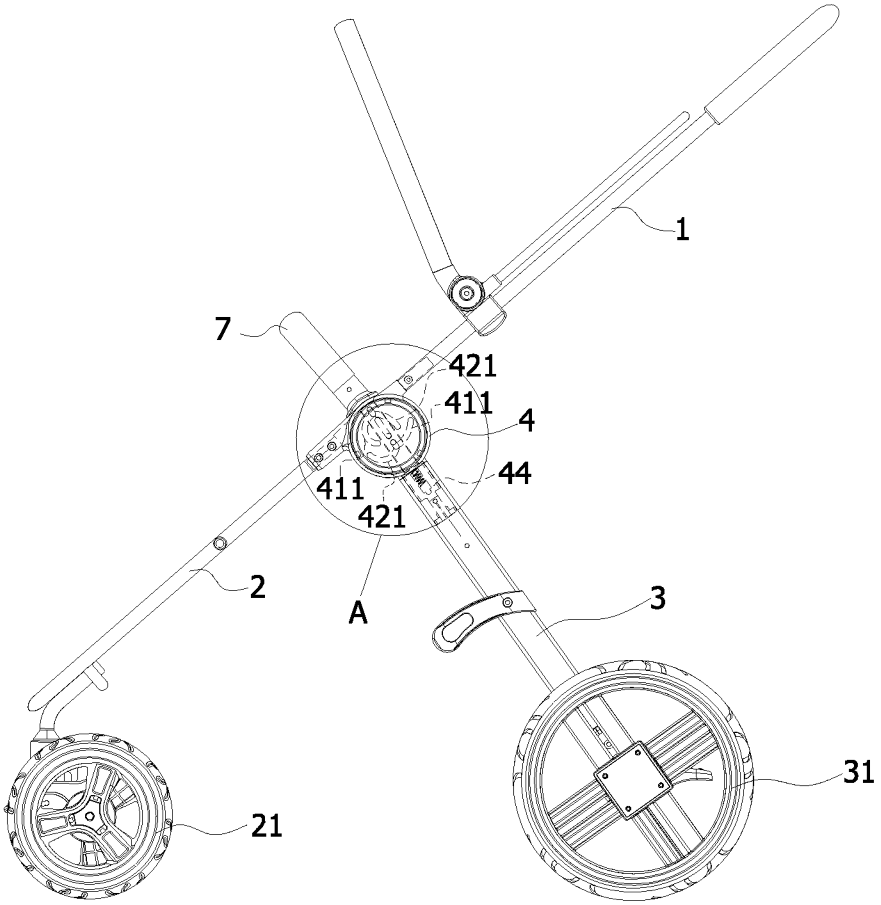
FIG. 2: A side view of the present invention when expanded.
Figure 3:
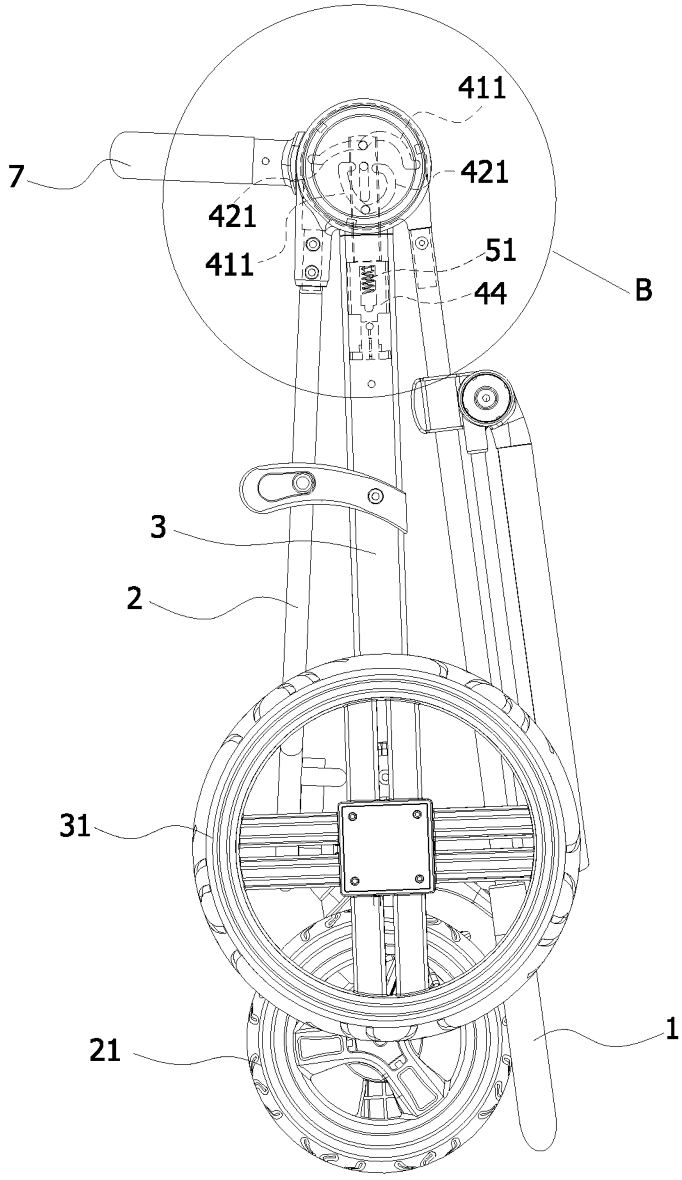
FIG. 3: A side view of the present invention when folded.
Figure 4:
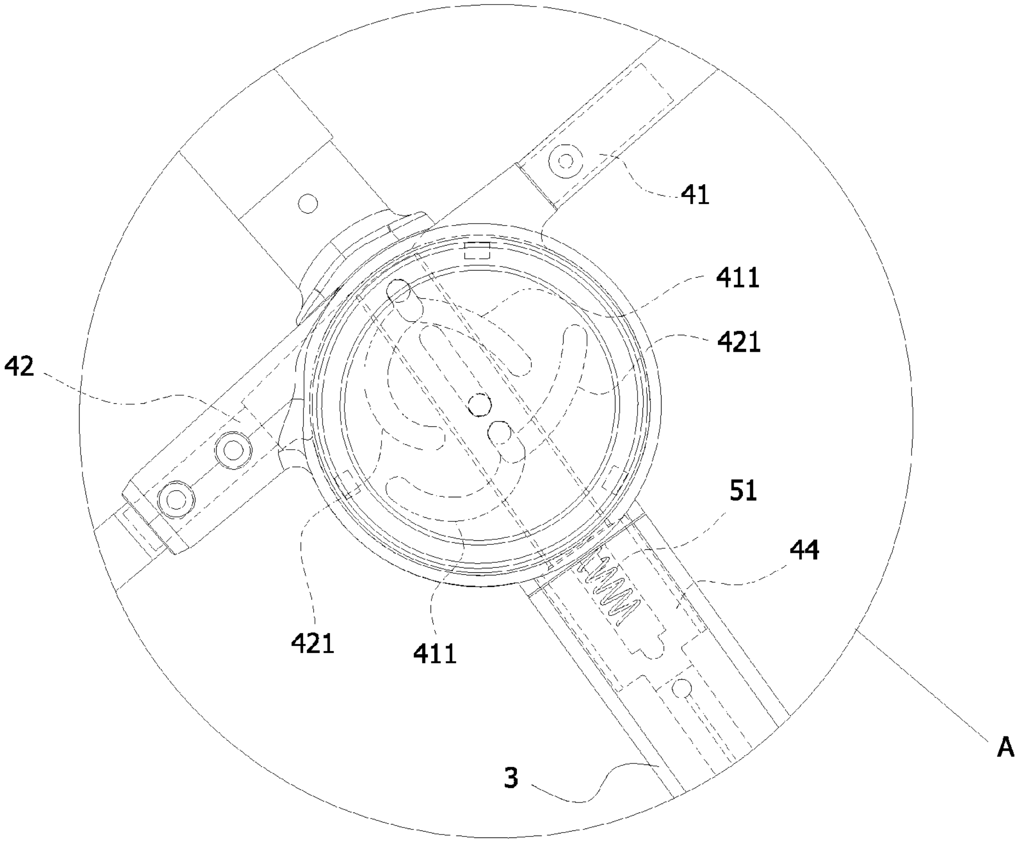
FIG. 4: A partially-enlarged transparent view of the A area in FIG. 2.
Figure 5:
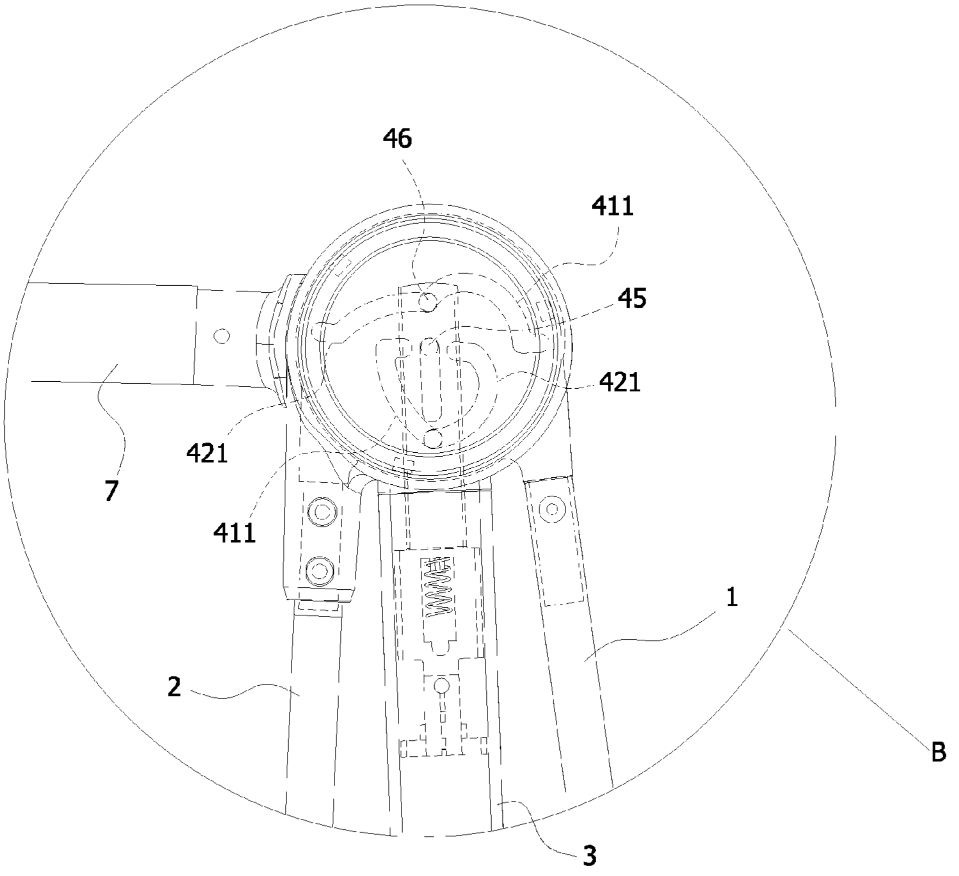
FIG. 5: A partially-enlarged transparent view of the B area in FIG. 3.
Figure 6:
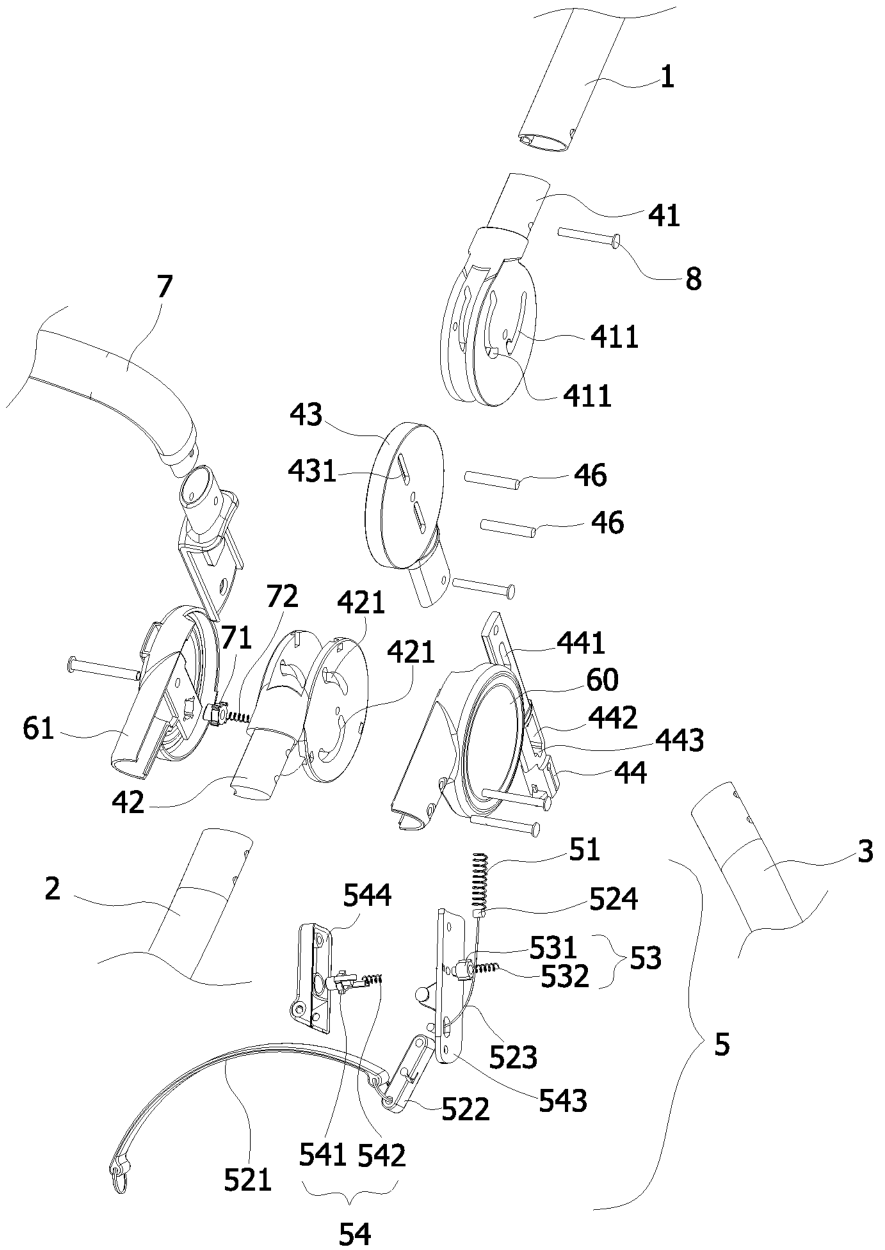
FIG. 6: An exploded view of the present invention.

The Detailed Description of the Preferred Embodiment for the present invention is as shown in the following drawings and descriptions:

As shown in FIG. 1-6, the present invention provides a Single-Hand Foldable Baby Stroller that includes a Hand Tube (1), a Front Leg Tube (2), a Front Helm (21), a Rear Leg Tube (3), a Rear Helm (31), and 2 Joint Components (4). Said Joint Components (4) connect the Hand Tube (1), the Front Leg Tube (2) and the Rear Leg Tube (3) together.

Each of said Joint Component (4) includes an Upper Joint (41), a Lower Joint (42), a Sleeve Tube (44), a Limiting Pedestal (43) and a Folding Operation Component (5). The Upper Joint (41) is connected with the Hand Tube (1), and the Lower Joint (42) is connected with the Front Leg Tube (2). One end of the Sleeve Tube (44) is inserted in the Limiting Pedestal (43), while the other end is sleeved in the Rear Leg Tube (3).

Said Upper Joint (41) and the Hand Tube (1), and the Lower Joint (42) and the Front Leg Tube (2), are both connected and fixed by the Rivet (8). Said Upper Joint (41), Lower Joint (42) and Limiting Pedestal (43) are connected and rotatable. An Alignment Pin (45) is inserted through said Upper Joint (41), Lower Joint (42), Sleeve Tube (44) and Limiting Pedestal (43), and two Path Grooves (411) (421) are on top of the Upper Joint (41) and the bottom of said Lower Joint (42), face opposingly to each other. Said Path Grooves (411) (421) include two Gradient Arc-shaped Grooves. When said Upper Joint (41) and Lower Joint (42) are turning, there is a common intersection point between said Path Grooves (411) (421), a Latch (46) is inserted through the intersection point said Path Grooves (411) (421) and said Sleeve Tube (44). When the Limiting Pedestal (43) is statistic, said Sleeve Tube (44) would be pushed to move inside of said Limiting Pedestal (43) by the torque created by the weight of said Hand Tube (1). Said Latch (46) is also driven by said Sleeve Tube (44), but restricted only to move within said Path Grooves (411) (421), force said Upper Joint (41) and the Lower Joint (42) both turning counter-clockwise. When said Hand Tube (1) with said Front Leg Tube (2) are moving toward the Rear Leg Tube (3), the moving range would be the arc-length of the Path Grooves (411) (421). One end of said Path Grooves (411) (421) both have a Latch Hole which is disposed in opposing end to contain the Latch (46) when the Stroller expands.

Said Sleeve Tube (44) has a Bar-shaped Groove (441) that allows the Alignment Pin (45) to penetrate through and limit said Sleeve Tube's (44) movement, along with an Slot (442) for the Restoring Spring (51). There is a Rivet that penetrates between said Sleeve Tube (44), Rear Leg Tube (3) and Slot (442), furthermore restricting the moving range of said Sleeve Tube (44) in the length of said Bar-shaped Groove (441). There is a Trench (431) on the spot where said Limiting Pedestal (43) corresponds to the Latch (46) and is parallel to the Bar-shaped Groove (441). Said Latch (46) is driven to move through said Trench (431) by said Sleeve Tube (44).

Said Folding Operation Component (5) includes a Restoring Spring (51), a Pulling Component (52), a Fastening Component (53), and a Button Component (54). Said Button Component (54) includes a Button (541) and a Button Spring (542) inside said Button (54). The tail extend of Said Button (541) penetrates through the Fixing Pedestal (543) into the Rear Leg Tube (3). There is a hole on the Fixing Pedestal (543) that allows the Button Spring (542) to penetrating through, along with a Lid installed on the outside surface of said Fixing Pedestal (543). Said Fastening Component (53) includes a Spring (532) inserted in the Sleeve and a Fastening Stud (531), one end of said Fastening Stud (531) is on the wall of said Rear Leg Tube (3). Said Button (54) and Fastening Granular (531) correspond to each other, when the Button (541) is pushed, said Fastening Stud (531) is detached from the wall of the Rear Leg Tube (3) due to said Button Spring (542), allowing said Sleeve Tube (44) to move by outer force.

Said Pulling Component (52) includes a Carrying Handle (521), a Lever (522), a Pulling String (523), and a Pulling Block (524). Said Lever (522) is pivotally connected to the Fixing Pedestal (543), with the Carrying Handle (521) installed on the Lever (522) and crosses through the Stroller Seat horizontally, said Carrying Handle (521) also flipping said Lever (522) over upwards. Said Lever (522) and Pulling Block (524) are connected through the Pulling String (523), and interacting with said Pulling Block (524). Said Pulling Block (524) is installed in the Installment Hole (443) installed on the Sleeve Tube (44). When the Carrying Handle (521) flipping the Lever (522) upwards, said Pulling Block (524) moves downwards, leading said Sleeve Tube (44) to move through the Rear Leg Tube (3).

Said Joint Component has a Protective Shell installed on its outside. Said Protective Shell includes an Outer Shell (60) and an Inner Shell (61). There is an Armrest (7) installed on the Protective Shell and crosses through the Stroller Seat horizontally. The two ends of said Armrest (7) are installed on said Inner Shell (61), with an Armrest Switch installed on the Armrest (7). Said Armrest Switch includes an Armrest Button (71) and an Armrest Button Spring (72), with the Armrest Button (71) embedded on said Inner Shell (61) and exposed outside the Armrest (7). The Armrest Button Spring (72) is installed on the Armrest Button (71) and connected with the Lower Joint (42).

The operating process of present invention is described as follows

When in use, the Stroller is in an expanded state with the Hand Tube (1) and the Front Leg Tube (2) in a fair or fixed diagonally angle. The Path Grooves' (411) (421) respective ends with Latch Holes cross each other, with the Latch (46) set on the common intersection point, while the Alignment Pin (45) is set on the rear end of the Bar-shaped Groove (441) on the Sleeve (44). Also, the Button (541) is in its early state, with the Fastening Stud (531) embedded in the Rear Leg Tube's (3) hole to fix the Sleeve Tube (44). When folding, press the Button (541), and the Button's (541) leg would clamp the Sleeve Tube (44) and, by the Button Spring (542), push the Fastening Stud (531) to be detached from the Latch Hole. Lifting the Carrying Handle (521) single-handedly would cause the Carrying Handle (521) to pull the Lever (522) upwards and lead the Pulling Block (524) to move toward said Sleeve Tube (44). The Restoring Spring (51) is also squeezed, and the Latch (46) follows the Sleeve Tube (44) to move downward from the Latch Hole, also, due to the torque generated from the Front Leg Tube (2) and the Hand Tube's (1) self-gravity, the Upper Joint (41) and Lower Joint (42) both turn counter-clockwise, causing the Front Leg Tube (2) with the Hand Tube to move toward the Rear Leg Tube (3). When the folding is complete, the Latches (46) is in the other end of said Path Grooves (411) (421). When expanding the Stroller, the Hand Tube (1) is lifted by outer force, the Front Leg Tube (2) and the Hand Tube (1) would move in the counter-direction due to the Latches (46) moving between said Path Grooves (411) (421). When the Latches (46) moving toward the Path Grooves' (411) (421) ends with Latch Holes again, the Front Leg Tube (2) and the Hand Tube (1) would stop moving, and the Sleeve Tube (44) moves upward by the recovering force of said Restoring Spring (51), with the Latches (46) are pushed into the Path Grooves' (411) (421) Latch Holes, while the Fastening Stud (531) would be bounced into the Rear Leg Tube's (3) hole by the Spring's (532) recovering force. With the Button (541) pressed, the Upper Joint (41) and the Lower Joint (42) would be jammed tight, and the Stroller is expanded.

Naturally, all that is described above with figures is simply the description of the preferred embodiment, which is not the limit of the present invention. Any modelizations and variations made from the scope of the present invention's structure, may match the characteristics claimed hereafter.

What is claimed is:

1. A Single-Hand Foldable Baby Stroller which comprises:

A Hand Tube (1), a Front Leg Tube (2), a Front Helm (21), a Rear Leg Tube (3), a Rear Helm (31), and 2 Joint Components (4);

Said Joint Components connect the Hand Tube (1), the Front Leg Tube (2) and the Rear Leg Tube (3) together;

Each of said Joint Component (4) includes an Upper Joint (41), a Lower Joint (42), a Sleeve Tube (44), a Limiting Pedestal (43) and a Folding Operation Component (5); said Upper Joint (41) is connected with the Hand Tube (1), and said Lower Joint (42) is connected with the Front Leg Tube (2); One end of said Sleeve Tube (44) is inserted in the Limiting Pedestal (43), and another end is sleeved in the Rear Leg Tube (3);

Said Upper Joint (41), Lower Joint (42) and Sleeve Limiting Pedestal (43), are connected and rotatable, an Alignment Pin (45) is inserted through said Upper Joint (41), Lower Joint (42), Sleeve Tube (44) and Limiting Pedestal (43), and two Path Grooves (411) (421) separately on top of said Upper Joint (41) and the bottom of said Lower Joint (42) which face opposingly to each other; there is a common intersection point between said Path Groove (411) (421), and a Latch (46) that is inserted through said Path Grooves (411) (421) and Sleeve Tube (44);

Said Folding Operation Component (5) includes a Restoring Spring (51) inside the Sleeve Tube (44), a Pulling Component (52), a Fastening Component (53) that positions said Sleeve Tube (44) in the Rear Leg Tube (3), and a Button Component (54) that drives the Fastening Component (53);

Said Button Component (54) drives the Fastening Component (53) to detach from the Rear Leg Tube (3), and the Fastening Component (53) drives the Sleeve Tube (44) to move, leading the Latch to move through the Path Grooves (411) (421), and cause the Upper Joint (41) and Lower Joint (42) both turn counter-clockwise.

2. Said Single-Hand Foldable Baby Stroller, as described in claim 1, is characterized in that:

Said Path Grooves (411) (421) positioned on said Upper Joint (41) and Lower Joint (42) include two Gradient Arc-shaped Grooves with a Latch Hole on one end of each Gradient Arc-shaped Groove, which can cause the Latch (46) to fall in when the Stroller expands.

3. Said Single-Hand Foldable Baby Stroller, as described in claim 1, is characterized in that said:

Said Sleeve Tube (44) has a Bar-shaped Groove (441) to be penetrated by the Alignment Pin (45) to limit said Sleeve Tube's (44) movement, and a Slot (442) for the Restoring Spring (51); A Rivet that penetrates through the Sleeve Tube (44), the Rear Leg Tube (3) and the Slot (442); a trench (431) on the spot of the Limiting Pedestal (43) that corresponds to the Alignment Pin (45) and is parallel to the Bar-shaped Groove (441); The Latch (46) is driven by said Sleeve Tube (44) to move through said trench (431).

4. Said Single-Hand Foldable Baby Stroller as described in claim 1, is characterized in that:

Said Button Component (54) includes a Button (541) and a Button Spring (542) inserted on the Button (54); the Button (541) penetrates through the Rear Leg Tube (3) and hold the leg of the Sleeve (44); said Fastening Component (53) includes a Spring (532) inserted through the Sleeve Tube (44) and into a Fastening Stud (531), end of said Fastening Stud (531) is on the wall of the Rear Leg Tube (3); Said Button (54) and Fastening Stud (531) correspond to each other, said Fastening Stud (531) is detached from the wall of said Rear Leg Tube (3) through the Button Spring (542) when said Button (54) is pushed.

5. Said Single-Hand Foldable Baby Stroller, as described in claim 4, is characterized in that:

Said Button (541) is installed on the Rear Leg Tube (3) through the Fixing Pedestal (543), the extension tail of said Button (541) is penetrating through the Fixing Pedestal (543) into the Rear Leg Tube (3); there is a hole on the Fixing Pedestal (543) that the Button Spring (542) to penetrates through, along with a Lid installed on the outside surface of said Fixing Pedestal (543).

6. Said Single-Hand Foldable Baby Stroller, as described in claim 1, is characterized in that:

Said Pulling Component (52) includes a Carrying Handle (521), a Lever (522), a Pulling String (523), and a Pulling Block (524); Said Lever (522) is pivotally connected to the Fixing Pedestal (543), said Carrying Handle (521) is installed on the Lever (522) and crosses through the Stroller Seat horizontally, and the Carrying Handle (521) is capable of flipping said Lever (522) over upwards. The Lever (522) and the Pulling Block (524) are connected through the Pulling String (523) and interact with said Carrying Handle (521), with the Pulling Block (524) moving the Sleeve Tube (44) in the Installment Hole (443) installed on said Sleeve Tube (44).

7. Said Single-Hand Foldable Baby Stroller as described in claim 1, is characterized in that:

Said Joint Component has a Protective Shell installed outside. Said Protective Shell includes an Outer Shell (60) and an Inner Shell (61), An Armrest (7) is installed on said Protective Shell and crosses through the Stroller Seat horizontally; The two ends of said Armrest (7) are installed on the Inner Shell (61), with an Armrest Switch inserted on the Armrest (7); said Armrest Switch includes an Armrest Button (71) and an Armrest Button Spring (72), with the Armrest Button (71) embedded on said Inner Shell (61) and exposed outside of said Armrest (7); Said Armrest Button Spring (72) is installed on said Armrest Button (71) and connected with the Lower Joint (42).

8. Said Single-Hand Foldable Baby Stroller as described in claim 1, is characterized in that:

Said Upper Joint (41) and the Hand Tube (1), and said Lower Joint (42) and the Front Leg Tube (2), are both connected and fixed by the Rivet.

* * * * *